United States Patent [19]

Ohmura

[11] Patent Number: 4,616,438
[45] Date of Patent: Oct. 14, 1986

[54] LINE GUIDE FOR FISHING ROD
[75] Inventor: Ryuichi Ohmura, Shizuoka, Japan
[73] Assignee: Fuji Kogyo Co., Ltd., Japan
[21] Appl. No.: 668,802
[22] Filed: Nov. 6, 1984
[30] Foreign Application Priority Data Dec. 6, 1983 [JP] Japan .......................... 58-188403[U]

[51] Int. Cl.⁴ .......................................... A01K 87/04
[52] U.S. Cl. ....................................................... 43/24
[58] Field of Search ............................. 43/24; D22/24

[56] References Cited

U.S. PATENT DOCUMENTS

| D. 261,920 | 11/1981 | Ohmura | D22/24 |
| 2,878,608 | 3/1959 | O'Brien | 43/24 |
| 3,222,812 | 12/1965 | Gorham | 43/24 |
| 3,769,735 | 11/1973 | Cousin | 43/24 |
| 3,997,997 | 12/1976 | Yamamoto | 43/24 |
| 4,287,678 | 9/1981 | Yamamoto | 43/24 |

FOREIGN PATENT DOCUMENTS

| 1052497 | 1/1954 | France | 43/24 |
| 1088082 | 3/1955 | France | 43/24 |
| 2085271 | 4/1982 | United Kingdom | 43/24 |

Primary Examiner—Gene P. Crosby
Attorney, Agent, or Firm—Wegner & Bretschneider

[57] ABSTRACT

A line guide for fishing rods having a pair of feet which contact with the surface of a fishing rod, legs extending from each end of the feet, and a guide ring supported by the legs, wherein the legs are provided at their lower ends with rod-contacting surfaces of a concave shape in cross-section, which are contiguous to the rod-contacting surfaces of the feet, the rod-contacting surfaces of the former having a width larger than that of the rod-contacting surfaces of the latter. The line guide exhibits larger stability against rotating force, and increases the flexibility of the fishing rod.

10 Claims, 6 Drawing Figures

LINE GUIDE FOR FISHING ROD

FIELD OF THE INVENTION

The present invention relates to improvements in the line guide to be secured to the surface of a fishing rod by means of winding threads.

BACKGROUND OF THE INVENTION

There is already known from Japanese Utility Model Publication No. 41-2548 and Japanese Utility Model Laid-Open Publication No. 52-116584 the concept of providing an increasing stability, against external force laterally applied to the guide with respect to the axis of fishing rods. The line guide disclosed in the specification of the former Utility Model and shown in the instant FIG. 6 is of the structure that each foot M of the guide is provided on both sides with pointed projections P, which, when the line guide is fixed to the surface of the fishing rod by winding threads, are designed such that they are thrusted into the surface of the fishing rod to hold the line guide in position. However, there is a fear that such pointed projections may damage the surface of the fishing rod. In recently developed thin fishing rods, such damage may possibly lead to fatal failure such as breakage of the fishing rod. With this arrangement, there is further problem that it is impossible to align the line guides after wrapping with winding threads.

Referring next to the line guide disclosed in Japanese Utility Model Laid-Open Publication No. 52-116584, each foot A of the guide is provided with a wide flexible seat B, as shown in the instant FIG. 5, which is placed onto the rod surface E of a rod body D by wrapping with winding threads C with fair compatibility, whereby stability of the line guide is increased, when external force is applied laterally with respect to the axis F—F of the rod. However, the presence of the wide seat B leads to decreasing flexibility of the fishing rod.

SUMMARY OF THE INVENTION

A main object of the present invention is to provide a line guide for fishing rods, which exhibits larger stability against rotating force, and which increases the flexibility of a fishing rod compared to a rod with a conventional guide.

According to the present invention, this object is achieved by the provision of a line guide for a fishing rod comprising a pair of feet which contact with the surface of a fishing rod, legs extending from each end of said feet and a guide ring supported by said legs, wherein said legs are provided at their lower ends with rod-contacting surfaces of a concave shape in cross-section, which are contiguous to the rod-contacting surfaces of said feet, said rod-contacting surfaces of the former having a width larger than that of the rod contacting surfaces of latter.

BRIEF DESCRIPTION OF THE DRAWING

The above-mentioned and other objects and features of the present invention will now become apparent from the following detailed explanation with reference to the accompanying drawings, in which.

DETAILED EXPLANATION OF THE INVENTION

Figure 1:
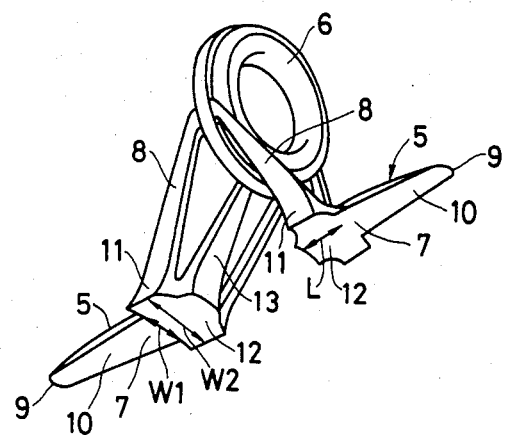
FIG. 1 is a perspective view of a first embodiment of the present invention.
Figure 2:
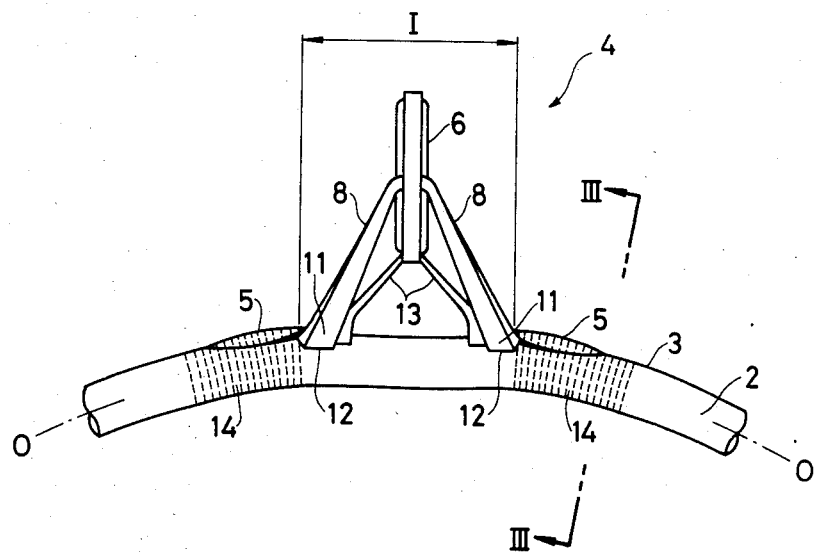
FIG. 2 is a side view showing a part of the fishing rod, which is flexibly fixed to the embodiment of FIG. 1.
Figure 3:
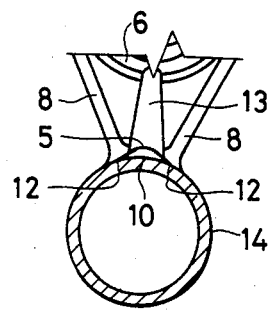
FIG. 3 is a sectional view which is taken along the line III—III of FIG. 2, and partly cut-away.

Referring to the first embodiment illustrated in FIGS. 1 to 3, a line guide 4 is engaged with a surface portion 3 of a rod body 2 of a fishing rod 1, and comprises feet 5 which are disposed on both sides of a guide ring 6. Legs 8 extend from one end of each foot 5 toward the guide ring 6, and serve to retain the guide ring 6 in place.

All members except the guide ring 6 are integrally formed of a synthetic resin such as nylon, which is reinforced with carbon fibers, glass fibers or the like, and the resin to be selected for that purpose should be of a character resembling to that of the rod body 2.

Each foot 5 has a width $W_1$, as shown in FIG. 1, decreasing from its end portion 7 to its free end portion 9, and a thickness gradually decreasing toward its free end portion 9, and the entire periphery of each foot 5 is made thin to form a thin edge, so that each foot 5 acquires flexibility.

A portion 10 of each foot 5 to be in engagement with the rod surface portion 3 is of concave shape in cross-section, in other words, it is constructed to fit on to a round pole. The width $W_1$ of each foot 5 is determined by the diameter of the fishing rod.

The legs 8 are contiguous to the end portion 7 of each foot 5, and comprise a lower end 11 provided with a rod-contacting surface 12 which is contiguous to the rod-contacting surface 10 of each foot 5, and is of a concave shape in cross-section. The width $W_2$ of the rod-contacting surface 12, as shown in FIG. 1, is wider than the width $W_1$ of the rod-contacting surface 10.

It is understood that the axial length L of the rod-contacting surface 12 should preferably be reduced as much as possible.

It is also noted that in FIGS. 1 to 3, reference numeral 13 is a bridged leg of the guide.

As illustrated in FIG. 2, the feet 5 are fixed to the rod surfaces 3 of the rod body 2 by winding threads 14. However, it is then preferred that the peripheral edges of the feet 5 are thinned in the form of thin blades to prevent any gap between the winding threads 14 and the rod surface 3. Since the tension is kept substantially constant regardless of the thickness of the threads to be wound, the more the number of the threads used, viz., the thinner the threads used, the larger the binding force per winding unit area will be. Consequently, it is required that the peripheral edges of the feet 5 should be thinned to prevent any gap between the winding threads 14 and the rod surfaces 3.

It is noted that the concavity of the rod-contacting surface 10 of each foot 5 has a depth assuring the shape corresponding to the convexity of the rod surface 3, but should preferably as shallow as possible so as not to impede the flexing of the rod.

Preferably, the concavity of the rod-contacting surface 12 of each leg 8 has a curvature slightly smaller than does the concavity of the rod-contacting surface 10 of each foot 5.

Figure 4:
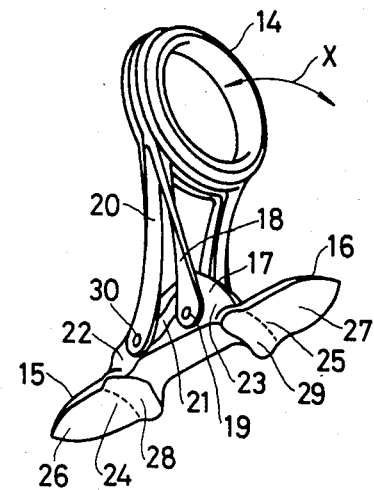
FIG. 4 is a perspective view of a second embodiment of the present invention.
Figure 5:
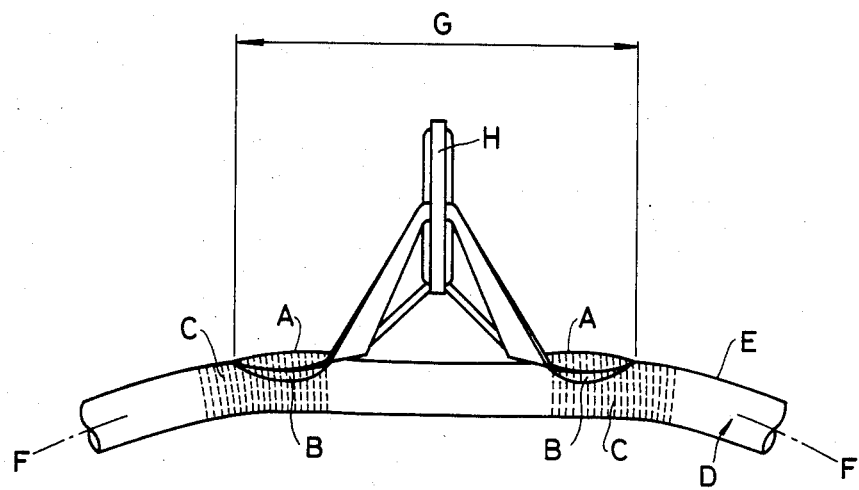
FIG. 5 is a side view showing a part of the fishing rod, which is flexibly fixed to the conventional line guide.
Figure 6:
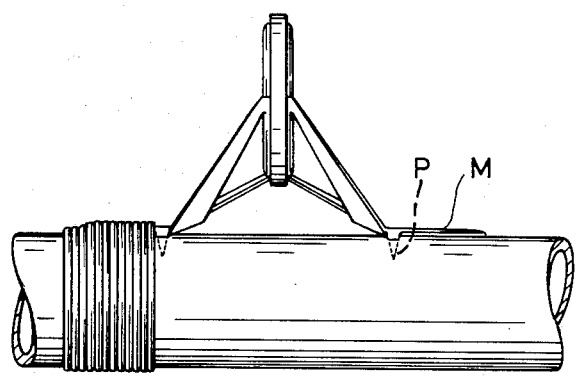
FIG. 6 is a side view showing a part of the fishing rod, which is fixed to another conventional line guide.

In FIG. 4, there is shown the second embodiment of the present invention, wherein a guide ring 14 is provided on both its sides with feet 15 and 16, which are joined together through a bracket 17. One leg 18 for holding the guide ring 14 is rotatably supported to the bracket 17 by means of a pin 19, while the other leg 20 for holding the guide ring 14 is slidably supported in a slot 21 in the bracket 17. This arrangement enables the guide ring 14 to be foldable in the directions shown by a double arrow mark X.

The bracket 17 and the legs 18 and 20 comprise a member corresponding to the legs 8 in the first embodiment. The bracket 17 is provided at its lower ends 22 and 23 with rod-contacting surfaces 28 and 29 of a concave shape in cross-section, which are contiguous to the end portions 24 and 25 of the feet 15 and 16 and the rod-contacting surfaces 26 and 27 of the feet 15 and 16. It is understood that the feet 15 and 16, the rod-contacting surfaces 26 and 27 and the rod-contacting surfaces 28 and 29 are of the same structure as in the first embodiment.

In accordance with the present invention, the legs are provided at the lower ends 11 or 22 and 23 with the rod-contacting surfaces 12 or 28 and 29 to be in engagement with the rod surface 3, said rod-contacting surfaces having a width $W_2$ larger than the width $W_1$ of the feet 5 or 15 and 16 prevent a lateral turning of the line guide. In addition, the presence of the rod-contacting surfaces 12 or 28 and 29 aids in maintaining the line guide stable, even when the feet 5 or 15 and 16 are of a thin and small size. In addition, the portion of the rod body 2, to which the line guide is attached, is flexible to some extent by making the feet 5 or 15 and 16 smaller and thinner, as shown in FIG. 2. Furthermore, the stiff rod section I is reduced considerably compared with the conventional section G.

What is claimed is:
1. A line guide for a fishing rod comprising a guide ring, a pair of downwardly extending front legs terminating in a front foot, and a pair of downwardly extending rear legs terminating in a rear foot, each of said feet:
   (A) having a heel portion and a narrow flexible toe portion extending to said heel, said heel portion being significantly wider than said toe portion, and
   (B) having a concave lower surface to essentially mate with the surface of said fishing rod, said concave lower surface extending for the full width of said heel portion.
2. A line guide as defined in claim 1, wherein the thickness of said feet tapers from the middle to the sides thereof.
3. A line guide as defined in claim 1, wherein the thickness of said feet tapers from the heel end to the toe end.
4. A line guide as defined in claim 1, wherein the length of said heel portion is substantially shorter than the length of said toe portion.
5. A line guide as defined in claim 1, further comprising a bracket interposed between said legs and said feet, said bracket bridging said feet, and one pair of said legs being rotatably supported in said bracket while the other pair of said legs is slidably supported in said bracket.
6. In combination, a fishing rod with the line guide of claim 1 affixed thereto.
7. In combination, a fishing rod with the line guide of claim 2 affixed thereto.
8. In combination, a fishing rod with the line guide of claim 3 affixed thereto.
9. In combination, a fishing rod with the line guide of claim 4 affixed thereto.
10. In combination, a fishing rod with the line guide of claim 5 affixed thereto.

* * * * *